Figure 3:
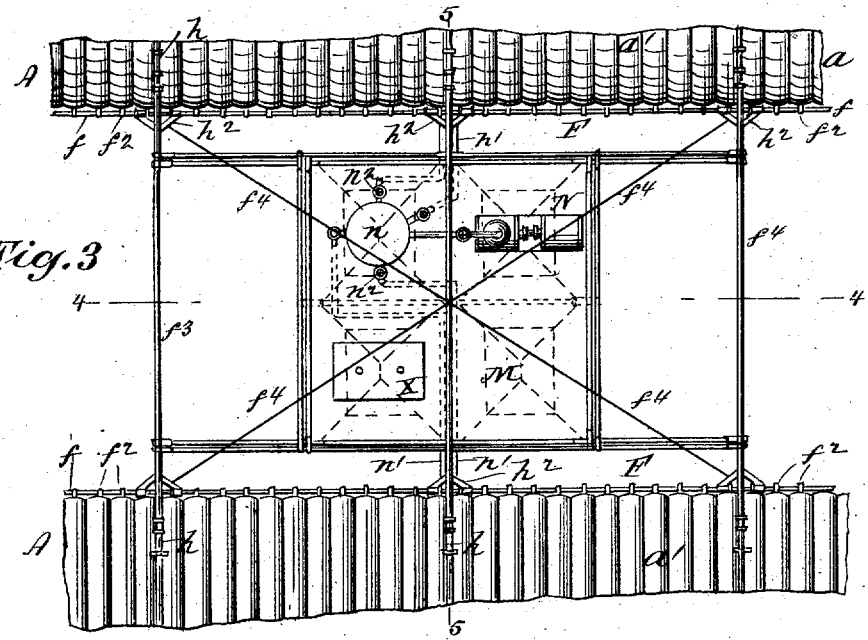

No. 868,223. PATENTED OCT. 15, 1907.
M. SCHIAVONE.
AIR SHIP.
APPLICATION FILED JULY 30, 1906.
10 SHEETS—SHEET 1.
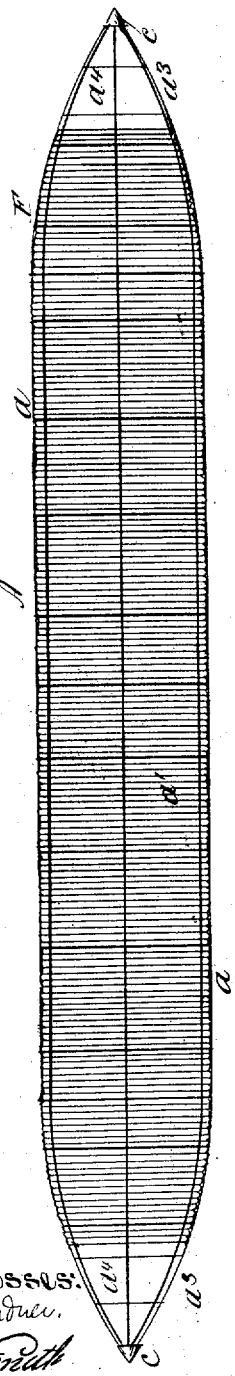
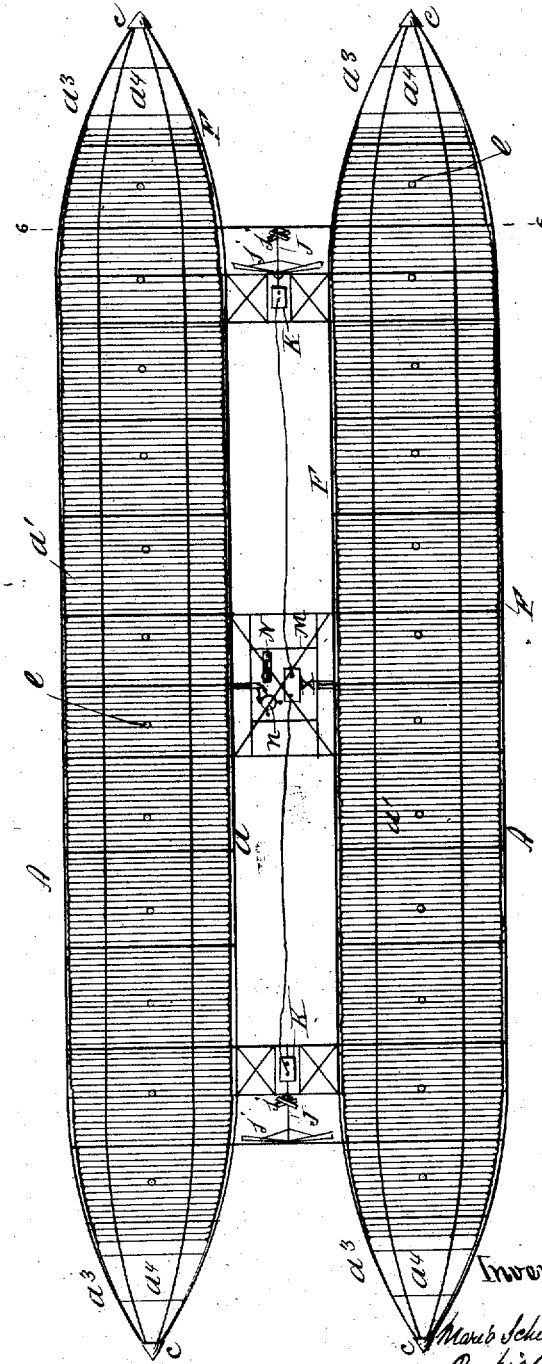

No. 868,223. PATENTED OCT. 15, 1907.
M. SCHIAVONE.
AIR SHIP.
APPLICATION FILED JULY 30, 1906.
10 SHEETS—SHEET 2.

Witnesses: Inventor:
Mario Schiavone
By his Attorney

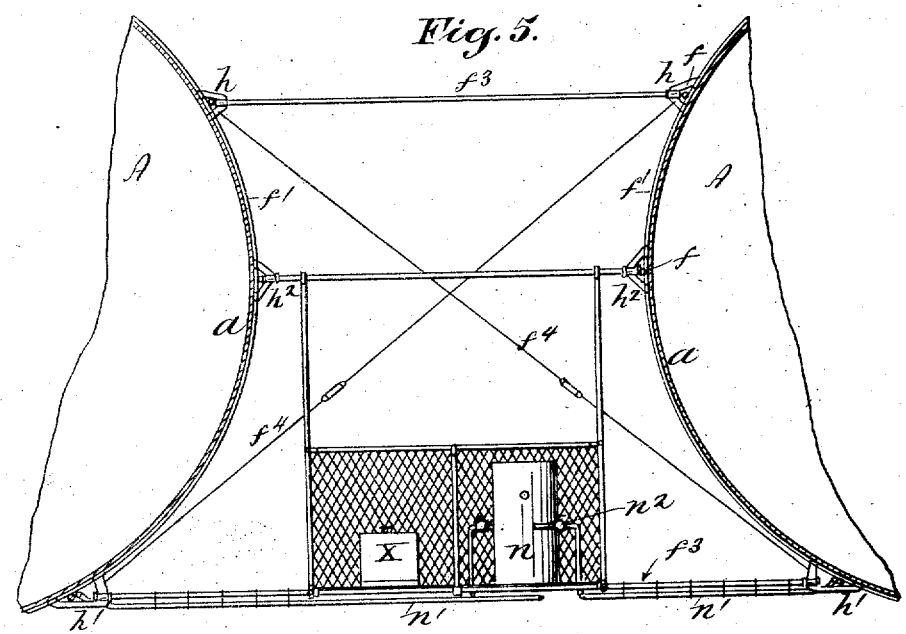
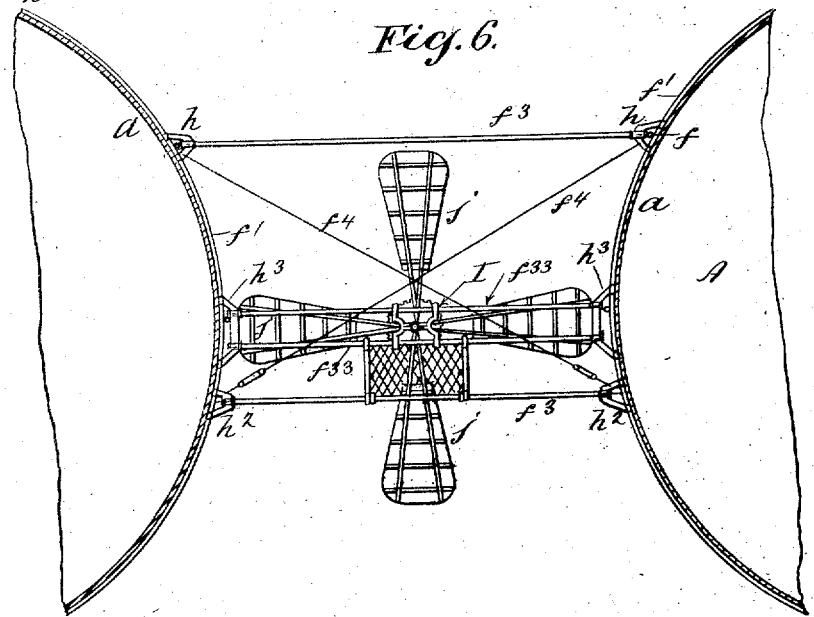

No. 868,223. PATENTED OCT. 15, 1907.
M. SCHIAVONE.
AIR SHIP.
APPLICATION FILED JULY 30, 1906.
10 SHEETS—SHEET 4.
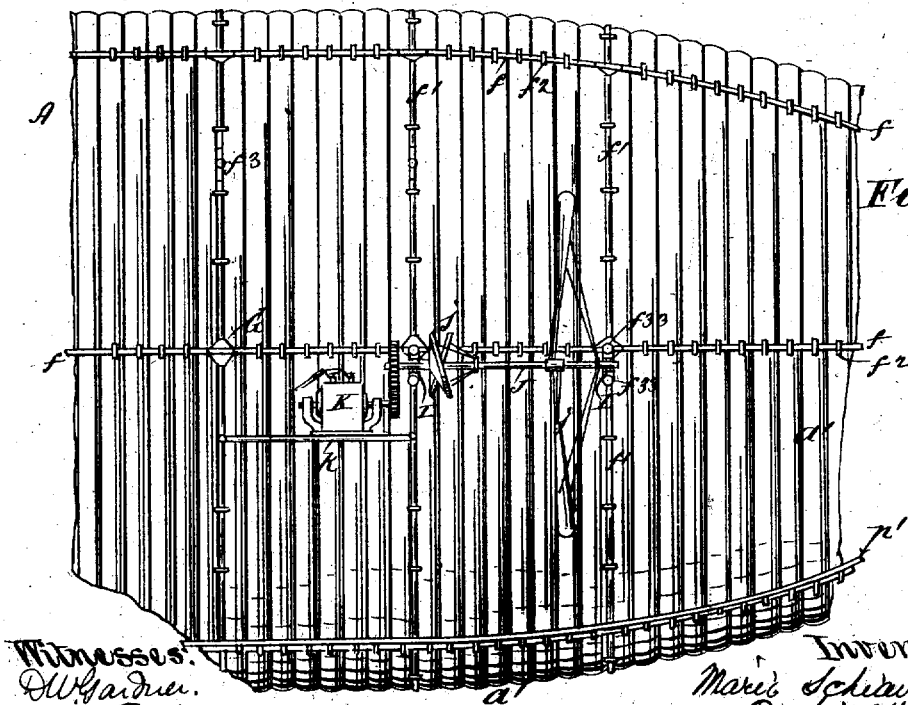

No. 868,223. PATENTED OCT. 15, 1907.
M. SCHIAVONE.
AIR SHIP.
APPLICATION FILED JULY 30, 1906.
10 SHEETS—SHEET 5.
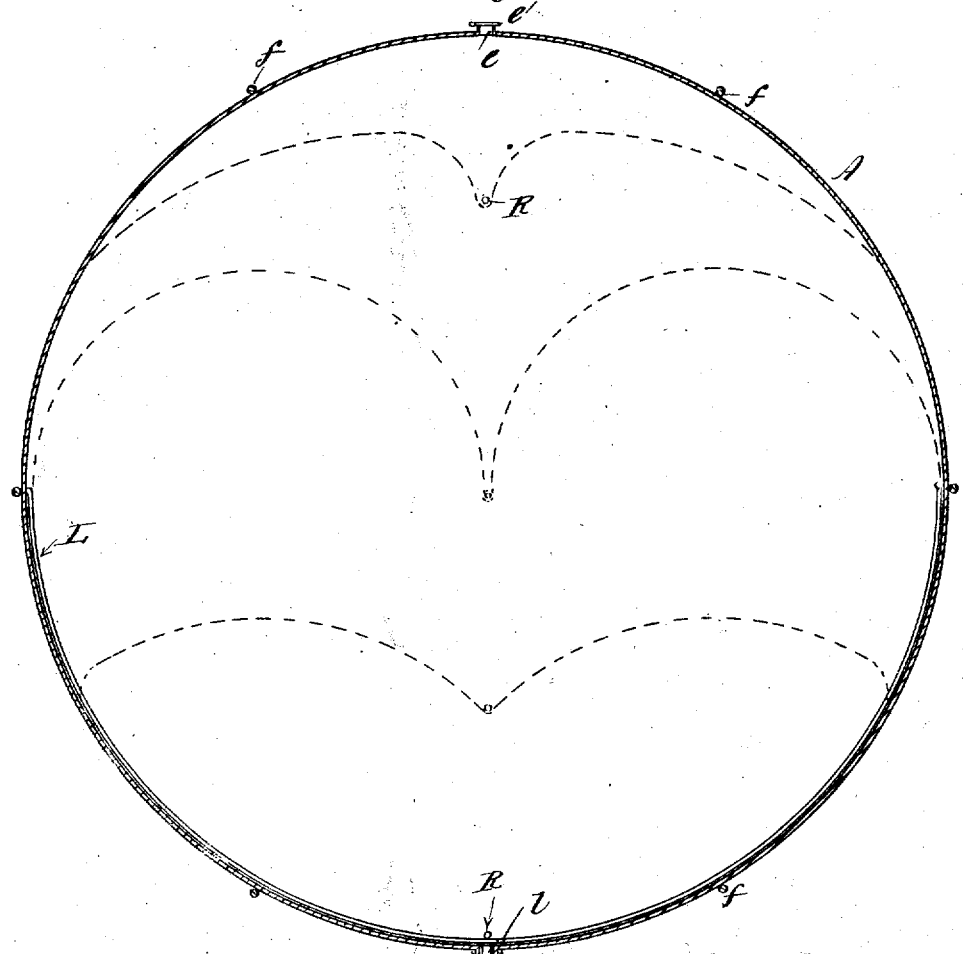
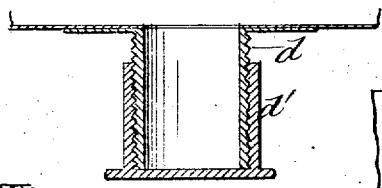
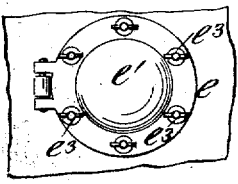
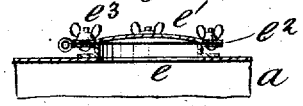

No. 868,223. PATENTED OCT. 15, 1907.
M. SCHIAVONE.
AIR SHIP.
APPLICATION FILED JULY 30, 1906.

10 SHEETS—SHEET 6.

Witnesses:
D. W. Gardner
W. H. Smith

Inventor:
Mario Schiavone
By his Attorney
Geo. Wm. Miatt

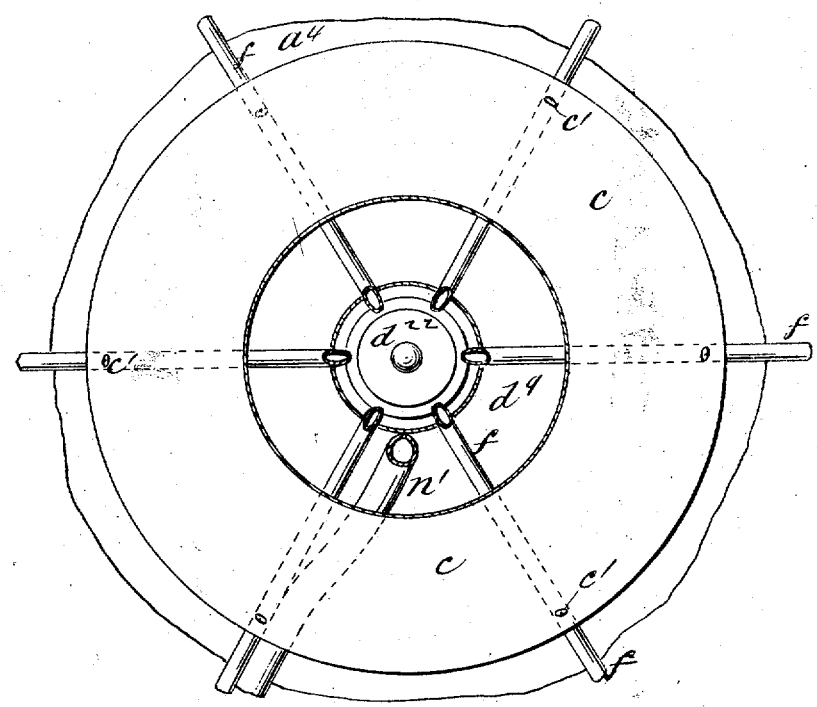
Fig. 15.
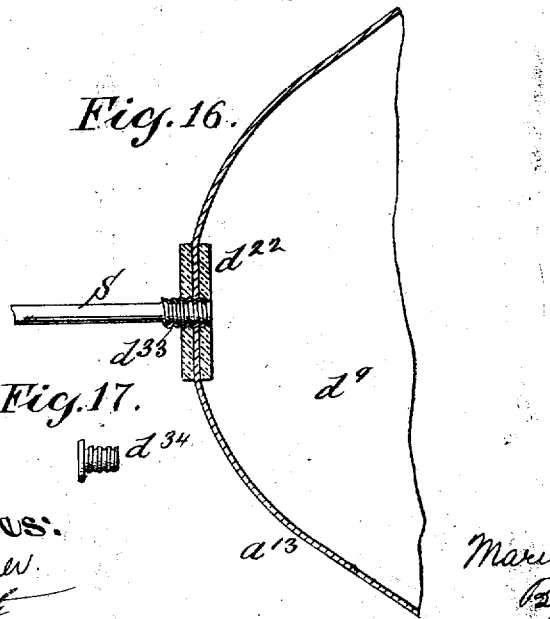
Fig. 16.
Fig. 17.

No. 868,223. PATENTED OCT. 15, 1907.
M. SCHIAVONE.
AIR SHIP.
APPLICATION FILED JULY 30, 1906.
10 SHEETS—SHEET 8.
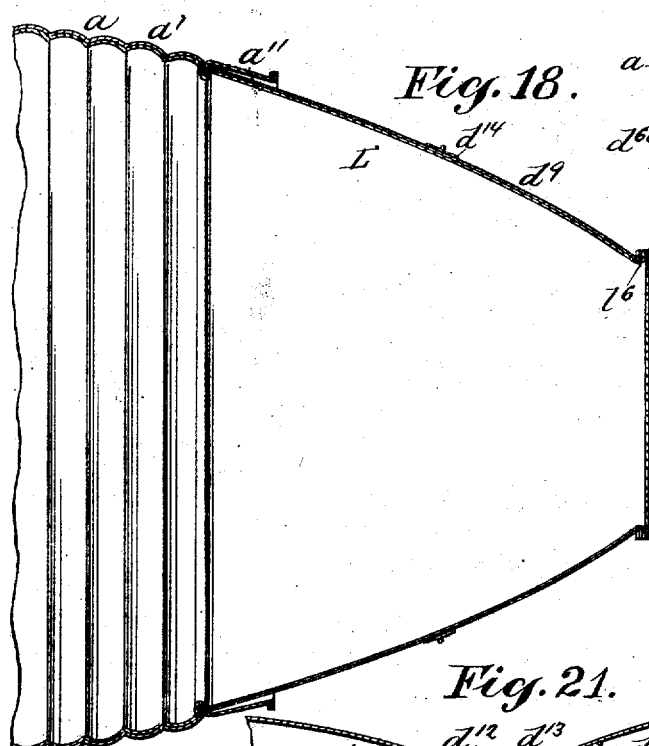
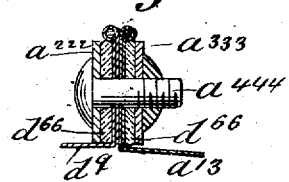
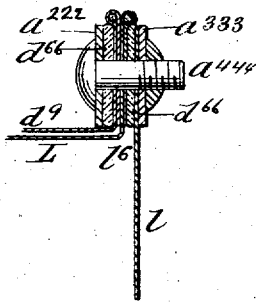
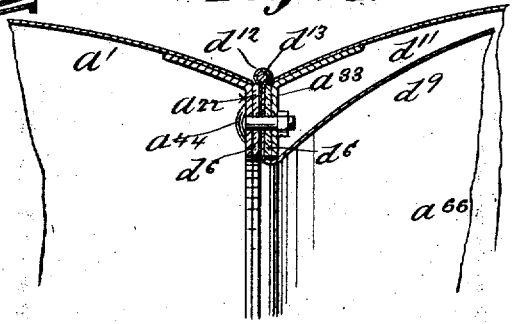
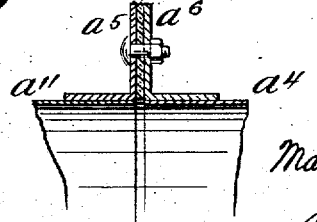

No. 868,223. PATENTED OCT. 15, 1907.
M. SCHIAVONE.
AIR SHIP.
APPLICATION FILED JULY 30, 1906.
10 SHEETS—SHEET 9.

No. 868,223. PATENTED OCT. 15, 1907.
M. SCHIAVONE.
AIR SHIP.
APPLICATION FILED JULY 30, 1906.

10 SHEETS—SHEET 10.

Witnesses:
D. W. Gardner
Fred Schacht

Inventor:
Mario Schiavone
By his Attorney
Geo. Wm. Miatt

UNITED STATES PATENT OFFICE.

MARIO SCHIAVONE, OF FERRANDINA, ITALY.

AIR-SHIP.

No. 868,223.  Specification of Letters Patent.  Patented Oct. 15, 1907.

Application filed July 30, 1906. Serial No. 328,376.

*To all whom it may concern:*

Be it known that I, MARIO SCHIAVONE, a subject of the King of Italy, residing at the town of Ferrandina, Province of Potenza, Italy, have invented certain new and useful Improvements in Air-Ships, of which the following is a specification.

Certain features of my invention are applicable to aerostats generally, although designed more particularly for the type of duplex-aerostat apparatus herein designated,—the structure shown and described affording a practical embodiment, in preferred form, of the essential principles involved in my improvements in the art of aerostation. Hence, in a broad sense, my improvements relate to the class of air vehicles in which the buoyance of a confined gas of relatively light specific gravity is utilized in sustaining and floating the apparatus as a whole in the atmosphere; and specifically to vehicles in said class in which a plurality of aerostats or floats are incorporated in a common structure supporting means for propulsion, steering, etc.

One of the main objects of my invention is to produce a type of self-buoyant air vehicle which shall be practically, to all intents and purposes, permanent in character in the sense that after it is duly prepared and charged with the buoyant medium, it will remain operative indefinitely, since the original supply of buoyant gas is retained intact. This I accomplish by inclosing the lifting medium, (a gas lighter than the atmosphere, and hydrogen by preference,) in sealed receptacles or floats, upon and between which the framework of the structure is supported. I am enabled to accomplish this desideratum, and at the same time dispense with both steering apparatus and ballast as heretofore used and understood in the art, by an important and distinguishing feature of my invention, which consists essentially in varying the specific density of the floats by means of compressed air introduced into compartments therein, said compartments being separated from the lifting medium by flexible diaphragms whereby the weight of the apparatus may be increased or diminished to cause it to ascend or descend vertically, or its center of gravity may be varied so as to utilize centripetal force in guiding it laterally and horizontally in the atmosphere, as hereinafter more fully set forth.

Other features of my invention relate to the peculiar configuration and structure of the floats, to the special construction of the skeleton framework, to the relative distribution and arrangement of parts, to the means for primarily effecting the introduction of the buoyant medium into the float; and to means for applying and controlling the compressed air &c., all described and claimed specifically herein.

The accompanying drawings illustrate the embodiment of the essential features of my invention in a practical apparatus of preferred form, although I do not confine or limit myself to minor details of construction shown, since various modifications and mechanical expedients may be resorted to without departing from the spirit and intent of my invention. Furthermore it is to be understood that certain features of my invention are applicable not only to the twin-float vehicle herein shown, but also to a single float of elongated form whether consisting of a rigid metallic shell or of a collapsible envelop as hereinafter pointed out. It is also to be understood that the size and thickness of certain parts are necessarily exaggerated out of proportion or scale in the accompanying drawings in order to clearly illustrate the structure under the requirements of the official rules governing drawings for the Patent Office.

Figure 4:
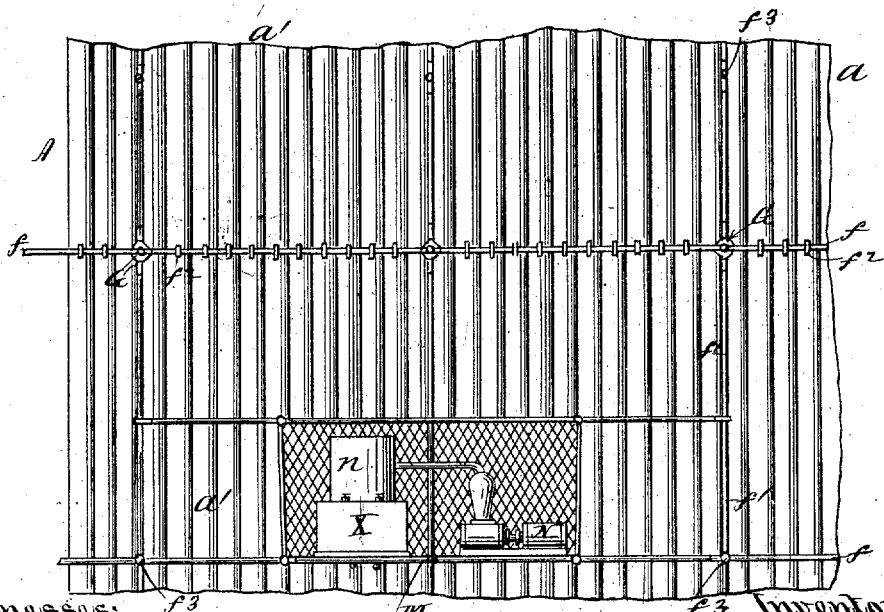
Figure 13:
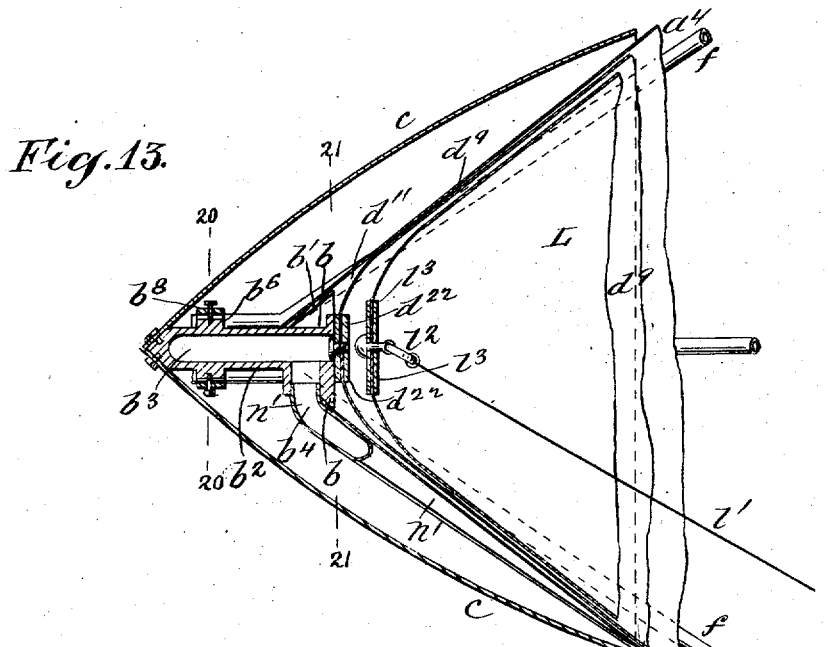
Figure 14:
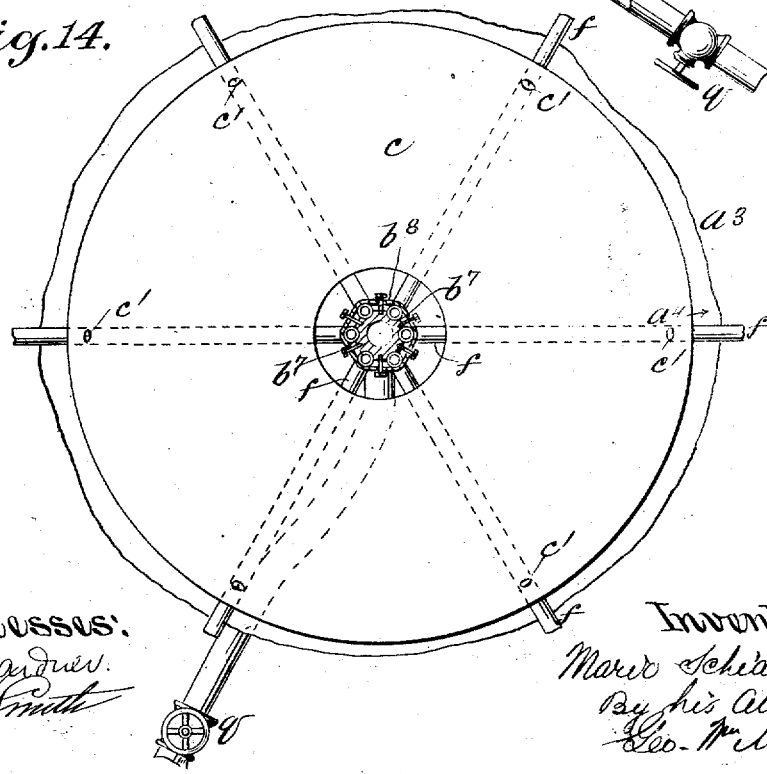
Figure 23:
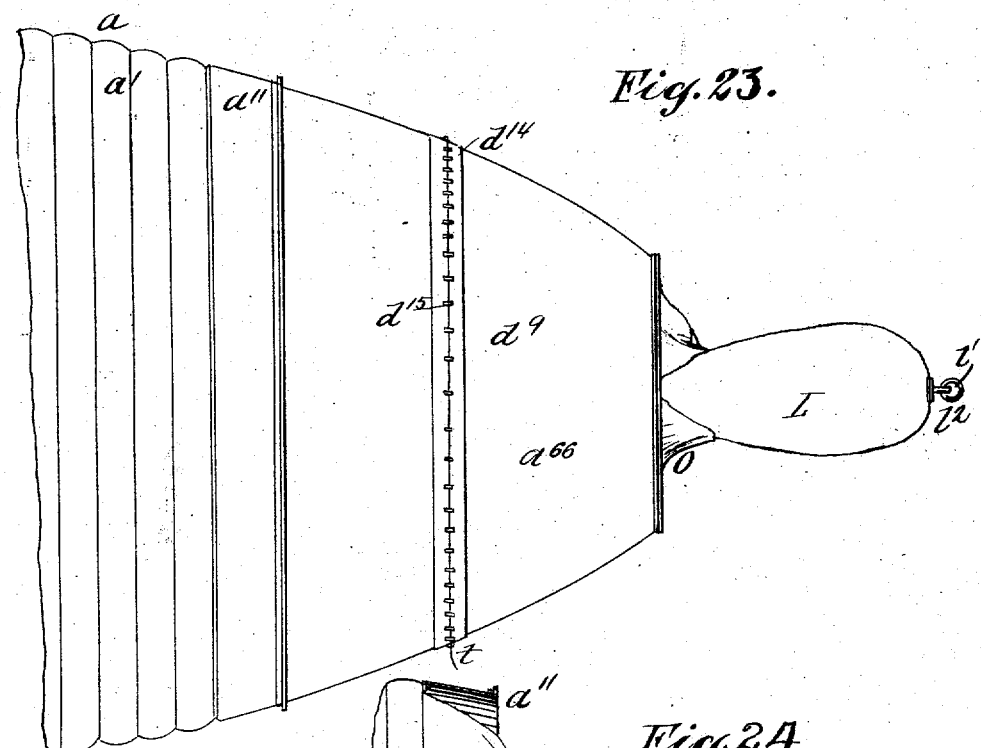
Figure 24:
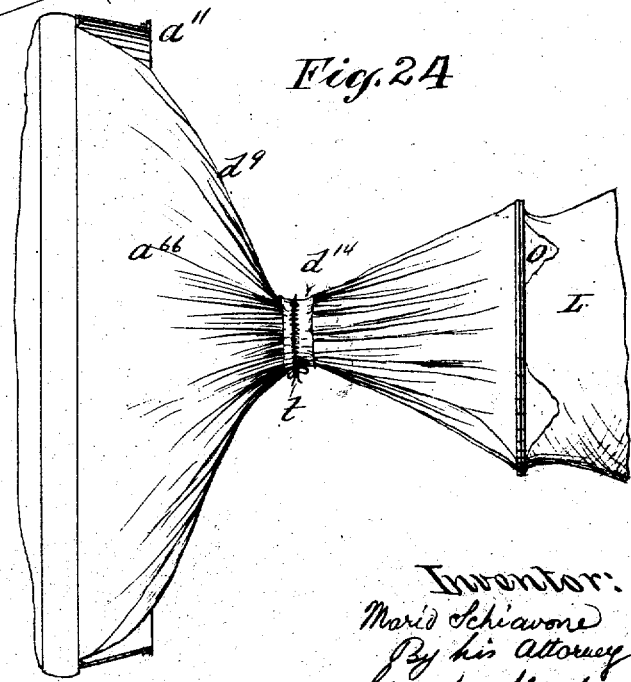
Figure 25:
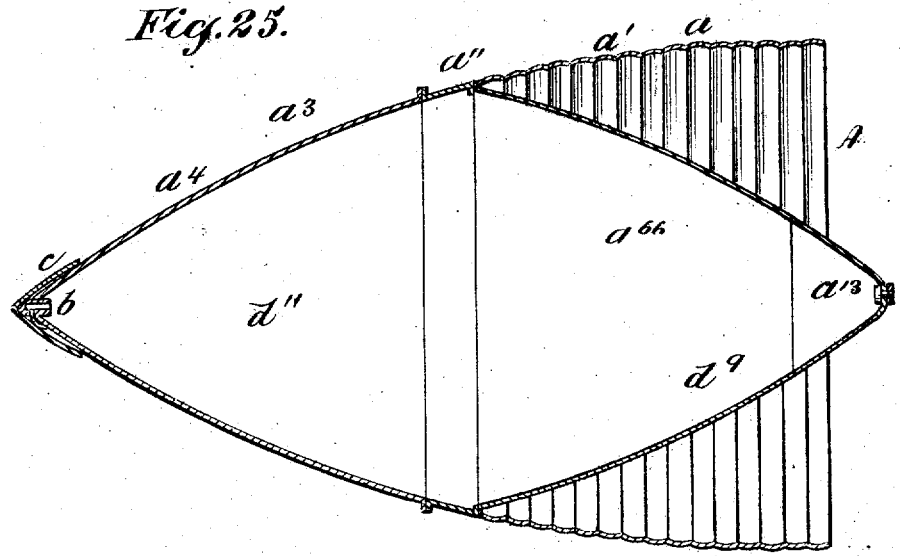
Figure 26:
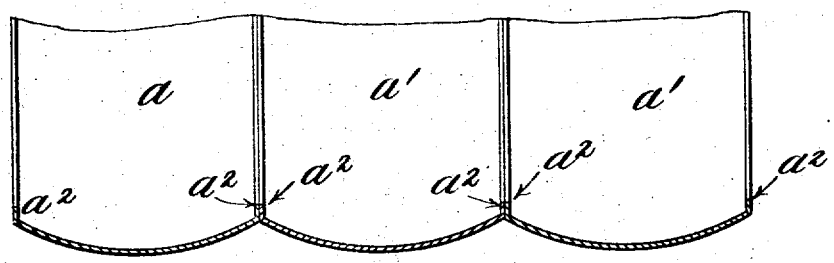

Figure 1, is a plan of my duplex-float air ship; Fig. 2, a side elevation thereof; Fig. 3, is a plan on a larger scale of the central platform and adjoining parts; Fig. 4, is a section upon plane of line 4—4—Fig. 3; Fig. 5, is a sectional elevation taken upon plane of line 5—5—Fig. 3; Fig. 6, is a sectional elevation taken upon plane of line 6—6—Fig. 1; Fig. 7, is a plan of one of the motor platforms and connections; Fig. 8, is a vertical sectional elevation taken upon plane of line 8—8—Fig. 7; Fig. 9, is a transverse section of a shell float on an enlarged scale, illustrating the operation of displacing the atmospheric air therefrom; Fig. 10, is a sectional detail of the nipple on the under side of the shell; Fig. 11, is a top view, and Fig. 12 a sectional view of one of the hatches, with which each shell is provided; Fig. 13, is a sectional view of the so called bow end of one of the floats; Fig. 14, a transverse section taken upon plane of line 20—20—Fig. 13; Fig. 15, is a section taken upon plane of line 21—21—Fig. 13; Fig. 16, is a sectional view of the bow end diaphragm showing the connection for introducing the hydrogen gas into the shell; Fig. 17, is an elevation of a plug suitable for closing the nozzle in the end of the diaphragm when the gas pipe is removed; Fig. 18, is a section of the stern end of a shell showing the atmosphere expelling lining inflated, also showing the disk by which said lining bag is closed during the operation of inflation; Fig. 19, is a section of said closing disk seal; Fig. 20, is a sectional view on a large scale through the joint by which the lining bag and closure disk are secured to the truncated end of the diaphragm; Fig. 21, is a cross section of the joint by which the edge of each diaphragm is secured permanently to its shell; Fig. 22, is a cross section of the joint by which the detachable apex-sections of the ends are secured to the shell; Fig. 23, is a section of the shell showing the truncated end of the diaphragm at the stern in elevation, together with a portion of the removable lining, and illustrating the method of withdrawing the lining from the shell through the closure disk; Fig. 24, is an elevation of the said diaphragm as closed or throttled after the removal of the temporary lining; Fig. 25, is a sectional view of an end of a shell showing the diaphragm inflated to its fullest extent by compressed air; Fig. 26, a section upon a larger scale of a portion of a shell showing in cross section the ends of adjoining annular sections.

In the drawings A, A, represent two aerostats or floats of equal size and shape, and identical in construction in every particular, so that the following description applies to both alike. Thus $a$, is an external shell or casing of relatively thin sheet metal, preferably aluminium on account of its low specific gravity, strength, ductility, and other well known inherent attributes which render it specially adapted for the purpose. This shell is formed with a cylindrical body having convergent ends, each tapering to a point, to facilitate the displacement of air when the vehicle is propelled therethrough in either direction. While not necessarily limiting myself thereto, the preferable and scientifically correct form of each end of the cylindrical shell is that of an ogival body, for the reason that this geometrical form of end piece effects the displacement of atmosphere with the least possible resistance, since it facilitates the afflux of the external fluid molecules at the bow and stern irrespective of the direction of motion. In this connection it may be well to note that the terms "bow" and "stern" are herein used mainly and relatively for purposes of convenience in description, since, as a matter of fact, after the air-ship is installed, charged with the buoyant medium, and ready for use as hereinafter set forth, the conditions are identical at each end of the vehicle. By the use of ogival ends united by an intermediate body of cylindrical form I am enabled to obtain the maximum of volume and the displacement with the minimum of superficial resistance. That is to say, the ends of the shell merge scientifically and correctly into a body of uniform prescribed diameter which is circular in cross section, and which therefore affords a maximum of area with a minimum of convex peripheral surface,—the center of the circle coinciding with the longitudinal axis of the shell, so that by regulating and prescribing the length of its cylindrical body in accordance with the requirements any desired degree of displacement may be obtained with the least possible peripheral surface for a given volume of buoyant medium as compared with floats of ovoidal shape heretofore used.

The cylindrical body of the shell $a$, is preferably built up and composed of a series of annular sections $a'$, which are externally convex in cross section, and may be formed with inturned edges or flanges $a^2$ (shown in Fig. 26) by which the adjoining sections $a'$, may be rigidly secured together in any suitable or well known manner, thus constituting practically a corrugated structure which is effectually reinforced and strengthened against external pressure. It is obvious that annular corrugated plates of other forms may be substituted for this specific form of flanged annular plate shown with substantially the same result, but my annular sections afford convenient means by which to build up a rigid corrugated shell of any desired or prescribed length.

The ogival shaped ends $a^3$, are each built up in part of a continuation of the annular body sections $a'$, decreasing gradually in diameter from the central cylindrical portion of the shell, and in part by a conical removable section $a^4$, of plain external surface. The outer edge of each of the last annular sections ($a''$) at the termination of the annular corrugated section $a'$, is not inturned but is straight, and has secured to it hermetically an external L-shaped flange plate $a^5$. The inner edge of each removable section $a^4$, has a corresponding L-shaped flange plate $a^6$, secured to it in like manner. The radially projecting members of these two L-shaped flange plates $a^5$, $a^6$, are bolted together to effect the attachment of the parts,—an annular gasket $a^7$, being first interposed between the opposed surfaces to insure an air-tight seal. See Fig. 22.

Fitting within, and hermetically attached to, the apex of each removable section $a^4$, is the conical flange $b'$, of an end piece $b$, having an extension $b^2$, projecting through the extreme end of the removable section $a^4$, to the outer end of which extension $b^2$, is secured an end cap $c$. The extension $b^2$, is hollow, being formed with a central chamber $b^3$, closed at its outer end but opening into the removable section $a^4$, and having a lateral port $b^4$, into which fits and is secured the end of a conduit or pipe $n'$, for the introduction of compressed air as hereinafter set forth. The extension $b^2$, of the end piece $b$, is also formed with a broad external annular flange $b^6$, having semi-circular recesses $b^7$, into which fit the extremities of the longitudinal members $f, f$, of the skeleton frame F, hereinafter described;—said extremities of the longitudinal members $f, f$, of the skeleton frame being held in place by the band $b^8$, which is screwed to said longitudinal members and to the end piece $b$, as will be understood by reference to Fig. 14. Said longitudinal members $f, f$, of the skeleton frame F, are furthermore secured by screws $c', c'$, to the end caps $c$, which latter protect the parts inclosed thereby, and at the same time afford a finished appearance and reduce frictional resistance.

In the bottom of each metallic shell $a$, and midway of its length is a mouth or nipple $d$, closed normally by a screw cap $d'$. At the top of each metallic shell is a series of small hatches $e, e$, arranged longitudinally and closed normally by hinged covers $e', e'$, held against suitable gaskets $e^2, e^2$, by screw bolts $e^3, e^3$. See Figs. 11 and 12.

The longitudinal members $f, f$, of the skeleton frame F, conform closely to the external configuration of the shell $a$, and consist of sections of aluminium tubing, the adjacent ends of which are united by coupling plates G, which also unite the adjacent ends of the tubular sections $f'$, also of aluminium, which constitute the laterally disposed bands or hoops of the skeleton frame work,—said hoops encircling the shells and each fitting snugly within one of the depressions formed between adjoining annular sections $a'$, of the corrugated portion of the shell $a$, as illustrated in Fig. 26. Any suitable form of coupling plate G may be used. These cross coupling plates G, are preferably made of aluminium, as are the screws for securing the extremities of the tubular sections in their respective sockets. They unite the longitudinal and transverse members or bands into a rigid cage or net completely embracing the shell $a$, to which case or net in turn they are rigidly secured, not only by the attachment of the extremities of the longitudinal members $f, f$, to the end pieces $b$, of the removable sections $a^4$, as hereinbefore described, but also by means of numerous straps $f^2$, also preferably of aluminium, by which both the band sections $f'$, and the longitudinal sections $f$, are secured directly to the shell $a$, at suitable intervals apart. The transverse bands $f'$, and longitudinal members $f$ of the skeleton frame F are thus made up of tubular sections for the purpose of attaining the maximum of rigidity and strength with the minimum of weight, although I do not necessarily confine myself to the tubular structure, since other features of my invention are not dependent thereon.

The two shells $a$, $a$, are coupled rigidly and permanently together and the several sections of the skeleton frame F united into one integral structure by the cross bars or ties $f^3$, and stay rods $f^4$. The cross bars $f^3$, are of course preferably formed of aluminium tubing, and in the construction shown in the drawings, the ends of the upper members are coupled to brackets $h$, (Figs. 5 and 6) secured to hoop sections $f'$. The brackets $h'$, for the lower cross bars are secured both to the hoop sections $f'$, and to the longitudinal sections $f$, of each shell cage. Some of the intermediate cross bars are in like manner coupled to cross brackets $h^2$, secured both to the hoop sections $f'$, and to the longitudinal sections $f$, while the twin cross bars $f^{33}$, $f^{33}$, designed especially for the support of the propeller shaft bearings are coupled to truss brackets $h^3$, and secured to hoop sections $f'$, of each shell cage. The cross bars $f^3$, are reinforced by any suitable number and arrangement of stay rods $f^4$, of any desired or well known construction, secured at their opposite extremities to the brackets to which the cage tubes are coupled as above set forth.

The propeller shaft bearings each form part of a spider bracket I, secured to twin cross bars $f^{33}$, as before intimated. Upon each propeller shaft J, is mounted one or more propellers $j$, of any desired or suitable construction. Each propeller shaft is driven by a motor K connected therewith and situated upon a platform $k$, supported between cross bars of the skeleton frame F, as will be seen by reference to Figs. 6, 7 and 8. Electric motors are shown symbolically in the drawings as arranged to drive the propeller shaft at each end of the apparatus, but this is by way of illustration only, as any desired type of motor may be employed for the purpose as may be found most expedient.

The propeller shafts are so arranged and mounted on the skeleton frame F that their longitudinal axes coincide in a line identical with the axis of resistance of the twin-float air ship. This longitudinal axis of both propulsion and resistance is of course midway between the longitudinal axes of the twin-floats, and sufficiently above the center of gravity of the apparatus as a whole to insure stability. Thus, when the longitudinal axes of the floats are in the same horizontal plane the center of gravity will be in the same vertical plane as, but below, said longitudinal axis of propulsion and resistance, a condition essential to stability whether the air ship is reposing horizontally, is in ascent or descent, or is traveling horizontally.

Midway between the extremities of the apparatus and the propellers is arranged a central platform M, designed to hold persons, engines, instruments, &c.,—said platform being supported by and upon the skeleton frame work in any suitable manner. This platform M is of light construction but sufficiently strong to support power generating apparatus X of some kind, as well as an air compressor N, and an accumulator reservoir $n$, for supplying air under pressure through the pipes $n'$, to the ends of the shells $a$. Both the compressor N and the pressure reservoir $n$, may be of any desired type, and are indicated more or less symbolically in the drawings, which show valves $n^2$, interposed in each of the four pipes $n'$ for the purpose of controlling the admission of compressed air to, or releasing it from, the end compartments of the shells as hereinafter set forth. To accomplish this in a simple manner these valves may be of the three way type, so that each end compartment may be put in communication either with the compression tank $n$, or with the atmosphere; and said valves may be operated independently or simultaneously, either manually or by any well known mechanical expedient.

It will be seen that the weight of the entire extrinsic system is distributed as much as possible along between and below the longitudinal axes of the shell floats, thus favoring and rendering possible their elongation, relatively, with respect to their volume or displacement to such a degree that a minimum only of frictional contact and resistance is afforded to the atmosphere. This result is also enhanced by the stability and rigidity of all the external parts, including the shells themselves as well as the skeleton frame work, connections &c. Furthermore, the ogival ends of the shells, by effecting the displacement of the atmosphere with the least possible agitation or disturbance thereof, also contribute to the general effect in lessening the resistance to be overcome when the vehicle is in motion.

It will be observed that no provision is apparently made for ballasting or steering my air ship and certainly not by ordinary or well known means. Both of these results I attain in an entirely original manner by the use of compressed air in connection with compartments in the shells $a$, separated from the compartments therein containing the hydrogen gas or other buoyant medium. This feature of my invention is not however necessarily restricted to floats having rigid metallic shells or covers, since the principle involved may be advantageously applied to elongated, collapsible floats if desired, with practically the same results,—the essential feature in this connection consisting in the use of compressed air, not only as ballast by reason of its density and greater specific gravity, but also for purpose of controlling the specific density of the gas which is employed as the buoyant medium in the float, substantially as hereinafter set forth. With this explanation I will proceed to describe special means shown in the accompanying drawings for effecting these desirable results in conjunction with an air vehicle having floats consisting of rigid metallic shells, it being understood that I do not limit myself to this preferred structure.

Near each end of each shell $a$, is secured an internal diaphragm $d^9$, of flexible material of such size and shape as to fit and line snugly the interior surface of its end of the shell in the absence of compressed air between it and said surface. Each of these flexible collapsible partitions or diaphragms $d^9$, may be compared to an ogival-shaped bag the open mouth of which is secured by its annular rim or edge to the shell by a hermetically sealed joint thus forming a compartment $d''$, at the extremity of the shell. Its function is to practically partition off and separate the body or central chamber of the shell from its particular end of the shell under certain conditions, although when fully collapsed into said end of the shell it constitutes simply a lining thereof as above intimated, while when expanded by the introduction of compressed air between it and the interior surface of its end of the shell it may be projected more or less beyond its sealed edge into the body or central chamber of the shell, and against the resistance of the buoyant medium therein contained.

Each flexible diaphragm $d^9$, is preferably formed of layers of strong silk superposed and united by intervening strata of rubber, so as to attain tenacity and flexibility, and little weight. The edge of the diaphragm $d^9$, may be permanently secured and sealed to the shell in any manner desired, although the method shown in Figs. 20 and 21, of the drawings is preferable. This consists in folding the edge $d^{12}$, of the bag over upon itself,—inserting an annular wire $d^{13}$ of aluminium in the fold and then clamping the folded edge between two internal flanges $a^{22}$, and $a^{33}$, secured respectively to adjacent edges of two of the permanent annular sections of the shell body $a$, the extreme edge $d^{12}$, of the fold containing the annular aluminium wire $d^{13}$, projecting externally from the joint as shown, to reinforce the fold against internal strain. The bases of the internal flanges $a^{22}$ and $a^{33}$, are soldered or otherwise secured to the internal surfaces of their respective body sections. Packing rings $d^6$, $d^6$, of suitable material are interposed between the folded edge of the diaphragm $d^9$, and the opposed surfaces of the flanges $a^{22}$ and $a^{33}$, before they are clamped together by screw bolts $a^{44}$, $a^{44}$, to insure a strong, compact and hermetically sealed joint. The outer edges of all four of the diaphragms $d^9$, are secured hermetically and permanently to the shell in this or a similar manner.

One of the flexible diaphragms $d^9$, say for distinction the bow diaphragm, is formed with a central disk $d^{22}$, of leather or other suitable material in which is embedded and through which projects, a coupling pipe or nozzle $d^{33}$, closed normally by a screw cap or plug $d^{34}$ shown in Fig. 17. Both the bow and the stern diaphragms are formed in two parts,—the one a truncated main portion $a^{66}$, having its outer edge secured permanently to the shell as above described, and the other a detachable central section $a^{13}$ which forms the cap or apex of the ogival diaphragm. See Figs. 20 and 25.

A zone or band $d^{14}$, of strong silk is sewed onto the truncated portion of the rear diaphragm on the outer side (that which rests against the inner surface of the convergent end when the diaphragm is deflated) to which are attached at suitable intervals guiding loops or rings $d^{15}$, through which is passed a strong flexible silk gathering cord to be used in throttling and closing this truncated portion of the diaphragm for the purpose and in the manner hereafter described.

Provision may be made for attaching and detaching the central or apex-section $a^{13}$, of the diaphragm to or from the non-detachable truncated portion thereof by various mechanical expedients. In the drawings (Figs. 18 and 21) each of the abutting edges of the two sections of the diaphragm is folded over upon itself, and an annular aluminium wire is inserted in the edge of the fold for the purpose of holding each rim thus formed distended. To the outer sides of these annular rims are applied annular packing rings $d^{66}$, $d^{66}$, backed by annular plates $a^{222}$, $a^{333}$, of aluminium, the joint being hermetically sealed by screw bolts $a^{444}$, $a^{444}$.

The object of making the diaphragms $d^9$, with a central detachable section $a^{13}$, is to provide for the introduction into the shell and the removal therefrom, of a temporary lining L for the purpose of effecting the displacement of the atmosphere from said shell and the introduction into it of the charge of hydrogen or other buoyant medium as hereinafter set forth, it being obvious that since the float has a rigid non-collapsible shell it cannot be charged with the buoyant medium in the usual and well known manner applicable to collapsible balloons or floats. Hence I provide the temporary or displacing lining L, consisting essentially of a light flexible impermeable bag of a shape and size approximating closely the internal surface of the shell within and against which it fits snugly when inflated therein. One end of this temporary lining is convergent or ogival in shape to conform to the interior surface of the diaphragm $d^9$, at that (the so called bow end) of the shell when said diaphragm is retracted; the other end of the temporary lining is also convergent but truncated, the open edge being turned outward and having secured to it an annular plate $l$, of aluminium to facilitate its attachment to the truncated end of the diaphragm $d^9$, at the other or so called stern end of the shell when the apex-section $a^{13}$, of said latter diaphragm is removed for this purpose.

To the forward, closed end of the removable lining L is attached by appropriate means a flexible cable of any suitable character $l'$, of a length sufficient to extend through the lining L, and shell $a$. In the drawings the inner end of the cable is shown as secured to an eye piece $l^2$, attached to leather disks $l^3$, $l^3$, secured to the apex of the ogival end of the lining.

O is a disk of varnished silk or other impervious material attached at its edge to an annular rim or plate $o$, of the same size as the annular plate $l$, on the truncated end of the temporary lining L.

The operation of charging a shell $a$, with hydrogen or other buoyant medium is performed in the following manner. The end sections of the skeleton frame and the removable sections of the convergent ends of the shell being detached, the apex-sections $a^{13}$ are also detached from the non-detachable truncated portion of each of the diaphragms. The covers $e'$, of the hatches $e$, at the top of the shell are opened and the cap $d'$, is removed from the mouth or nipple $d$ at the bottom of the shell. The temporary lining L is then introduced into the shell $a$, and spread over the lower half thereof, the outer surface of the under half being preferably though not necessarily, fastened temporarily to the opposed lower half of the shell, so as to spread out the lining in a semi-circular or semi-cylindrical form as indicated in Fig. 9,—a flexible neck or conduit $l^4$, protruding from the bottom of the lining having been first passed through the nipple $d$, on the underside of the shell $a$. The truncated end $l^5$, of the lining L and the closing disk O are then attached to the truncated end of the rear diaphragm in place of the removed apex-section $a^{13}$, thereby closing and hermetically sealing the temporary lining,—the only other opening thereto being through the flexible neck or conduit $l^4$, which is now attached to a tube $p$, for the introduction of compressed air. A flexible metallic cable, chain or equivalent R is introduced through one of the hatches at one extremity of the shell, passed longitudinally over the deflated lining through loops, provided for the purpose so as to rest thereon centrally, and then out of one of the hatches at the other extremity of the shell. Compressed air is now admitted through the tube $p$, and inflates the lining gradually, the weight of the cable R resting longitudinally upon the central portion of the upper side of the lining tending to render the inflation bi-laterally symmetrical and uniform as indicated by the dotted lines in Fig. 9, so that the lining is distributed evenly and smoothly over the inner surface of the shell, thus facilitating the inflation and avoiding kinks or folds in the lining that might strain it unduly in parts or prevent its completely filling the interior of the shell, which is essential in order that the atmosphere may be entirely expelled therefrom through the open hatches $e$.

When the inflation is nearly complete the cable R is withdrawn through one of the hatches. When the inflation is fully completed so that the outer surface of the lining fits snugly against practically the whole interior surface including the concavities of the annular sections of which the body of the shell is composed as well as the interior surfaces of the collapsed diaphragms $d^9$, $d^9$, at the ends thereof, the flexible neck or conduit $l^4$, is closed in any suitable manner, as by tying or throttling it with a cord and then thrusting it into the shell through the mouth or nipple $d$, which is then closed by the screw cap $d'$. The hatches $e$, are then closed, the apex sections $a^{13}$ attached to the forward diaphragm and the plug or cap $d^{31}$, is removed from the coupling pipe or nozzle $d^{33}$, in the leather disk at the apex of the bow diaphragm $d^9$, and the end of a pipe S screwed into the nozzle $d^{33}$,—said tube S communicating with a supply of hydrogen or other buoyant medium. The disk O closing the truncated end of the lining bag L, is then slit open and the free end of the flexible cable $l$, withdrawn through the opening and attached to a windlass or other device by means of which the lining bag L may be caused to revolute upon itself, or be turned "outside in". In other words the temporary lining is gradually but forcibly withdrawn through the truncated end of the rear diaphragm bringing the contained air (which has been reduced to atmospheric pressure by the slitting of the disk O) with it, while at the same time hydrogen or other buoyant gas is admitted to the shell through the pipe S to fill the space in the shell $a$, vacated by the lining bag L, and its contents.

When the lining L has been entirely retracted and withdrawn from the shell and the truncated end of the rear diaphragm, the latter is tightly closed by means of the gathering or throttling cord $t$, which is then securely tied as indicated in Fig. 24, thereby effectually cutting off communication between the interior of the shell and the lining bag L. Under these conditions the latter can with safety be detached from the truncated end of the diaphragm and the removable apex section $a^4$, of the diaphragm replaced and hermetically sealed thereto, after which the cord $t$, may be loosened. The pipe S being now disconnected from the coupling nozzle $d^{33}$, in the diaphragm at the other end of the shell, and replaced by the cap or plug $d^{34}$, the removable sections of the shell and of the skeleton frame at both extremities of the shell may be replaced and secured in position. The compressed air pipes $n'$, $n'$, leading to the hollow end pieces $d, d$, at each extremity of the shell, if of flexible material as is preferable, adapt themselves to the dismounting and remounting of the detachable sections $a^4$, of the convergent ends of the shell, otherwise they are provided with special cut off valves $q$, at or near said detachable sections $a^4$, and are disconnected between said valves $q$, and the accumulator reservoir $n$, during the operation of charging the shells with the bouyant medium as above specified. The main function involved in the use of the lining bag L, being to effect the displacement of the air within the rigid non-collapsible metallic shell $a$, it is obvious that if it were inflated with the bouyant medium in lieu of the compressed air it might be retained as a permanent lining, the principal objection to this being the added weight of the lining bag L, itself which it is obviously desirable to dispense with. If desired however as a permanent lining, in such case of course, both ends of the bag L could be closed and of the same shape as the bow end herein described and shown, but in other respects, since the lining L, would fit and completely conform to the interior surfaces of the diaphragms $d^9$, $d^9$, as well as to that of the shell $a$, the effect of the introduction of compressed air into, or its release from, the compartments $d''$, $d''$, would be identical with that herein set forth, the only difference being that the diaphragm would act through the lining L against the buoyant medium instead of being in direct contact therewith. Both of the shells $a$, $a$, having been thus charged with a buoyant gas, communication having been established between the compressed air accumulator or reservoir $n$, and the diaphragm chambers $d''$, $d''$, in the ends of said shells, and the apparatus otherwise prepared for use (it being understood that the aggregate weight of the apparatus must necessarily be less than the weight of the atmosphere displaced by it) the density of the buoyant medium and the specific gravity of the apparatus is regulated and controlled by means of compressed air introduced into or released from the said chambers $d''$, $d''$, from the reservoir $n$, through the medium of the valves $n^2$, and tubes $n'$,—the valves $n^2$, being three way valves as hereinbefore described, or provision being otherwise made for intruducing the compressed air into and releasing it from the compartments $d''$, $d''$. In this connection it must be borne in mind that the compressed air is condensed from the atmosphere only as wanted, the reservoir $n$, supplied by the air compressor N, when necessary, being designed simply to act as a compensator in which the pressure will be practically uniform, and to maintain only a suitable margin or surplus of compressed air for immediate use, it being inexpedient to carry any considerable quantity of compressed air on account of its weight. Owing however to this very fact that its specific weight is necessarily greater than that of the atmosphere from which it is drawn and condensed it is available as ballast when introduced into the compartments $d''$, $d''$, as well as for the purpose of compressing or regulating the density of the hydrogen or other buoyant medium by the compression of the same within the central chambers of the floats. In fact, for that matter the compartments $d''$, $d''$, might be separated from the central compartment containing the buoyant medium by stationary rigid diaphragms, instead of the flexible diaphragms $d^9$, shown and described, in which case, while there would be no alteration in the density of the buoyant medium, the compressed air admitted to or released from the compartments $d''$, $d''$, would act as ballast to increase or diminish the specific gravity of the apparatus. Thus by the use of the air compressor and connections in conjunction with the end compartments $d''$, $d''$, in the floats A, I am enabled to utilize the surrounding atmosphere not only as a means by which the density of the buoyant medium may be varied, but also as an inexhaustible supply of ballast which may be taken aboard or discharged at will.

By the use of flexible diaphragms $d^9$, $d^9$, fitting when collapsed snugly into the convergent ends of the shells $a$, $a$, the full capacity of the latter is rendered available for the buoyant medium, while the limit of altitude to be attained with safety is determined by the area and capacity of the compartments $d''$, $d''$, when the diaphragms are inflated to their fullest extent as illustrated in Fig. 25. In other words the capacity of the compartments $d''$, $d''$, prescribe the quantity of compressed air which may safely be forced into said compartments, and hence the degree of density to which the buoyant medium may be reduced as well as the amount or weight of ballast which may be acquired from the atmosphere.

The compressed air is used to "trim" the ship and keep the longitudinal axes of the two floats A, A, in the same horizontal plane. That is to say any slight variation of the center of gravity from the prescribed point may be compensated for by the introduction of compressed air into one or more of the end compartments $d''$, to counterbalance any excess of weight at any part of the apparatus, thus insuring and maintaining the perfect alinement of the vehicle in ascending or descending or traveling in a straight line in either direction in a horizontal plane.

When it is desired to steer the vehicle laterally in either direction compressed air is added to the float on the side on which it is desired to have the vehicle turn, thus shifting the center of gravity temporarily to that side of the apparatus and utilizing centripetal force in rendering the vehicle dirigible in horizontal curvilinear directions,—the vertical movement of the vehicle being effected and controlled by the introduction into or release from, each end compartment $d''$, of an equal quantity of compressed air. It will thus be seen that steering mechanism in the ordinary sense of the term is dispensed with, the vehicle being rendered dirigible in any and all directions by simply regulating and varying the amount of compressed air in the several end compartments $d''$. Furthermore, this can be accomplished in the most accurate and delicate manner since the apparatus is instantly responsive to any change or modification in the supply or distribution of the compressed air, so that very slight variations in altitude or direction may be easily attained by the introduction or release of comparatively small quantities of compressed air slowly into or from the end compartments $d''$, or if so desired, as in case of emergency a practically instantaneous and radical change may be effected in altitude or direction, or both, by the injection into, or release from said end compartments $d''$, of relatively large quantities of compressed air.

A feature of my system of rendering the apparatus dirigible both vertically and horizontally by the use of compressed air is the element of safety involved, for the reason that the hydrogen or other buoyant medium and the compressed air are both positively inclosed and controlled in rigid structures which if properly made and proportioned to withstand the internal and external pressure to which they are designed to be subjected can neither collapse nor burst asunder,—the only flexible yielding parts subject to strain being the diaphragms $d^9$, interposed between the hydrogen or other buoyant gas and the compressed air. As however the pressure of compressed air on one side of each diaphragm is neutralized by the resistance of the buoyant gas on the other side thereof, it is obvious that there is little or no danger of the rupture of a diaphragm during ordinary conditions of use. Furthermore the charge of hydrogen or other buoyant gas is positively confined within certain prescribed limits and fixed in character, so that the available lifting capacity of the apparatus cannot deteriorate below a prescribed and pre-determined degree.

It will thus be seen that by the use of the simplest possible means I overcome and control gravity, buoyancy, and inertia in an aerial vehicle which is substantially permanent in character, geometrically correct in configuration in that a maximum of atmospheric displacement is attained with a minimum of superficial resistance, and in which the stability and alinement of the apparatus is assured by reason of the following facts, namely that the weight is distributed longitudinally, that the axis of propulsion is below the longitudinal axes of the floats, that the axis of resistance is coincident therewith, and that the center of gravity is below said common axis of propulsion and resistance.

An aerial vehicle built in accordance with my invention affords certain practical advantages in navigation. From the central platform all the operative parts may be actuated and controlled to advantage. Furthermore the space above the platform is available for astronomical observation for the purpose of ascertaining longitude and latitude, direction of travel &c.

The hydrogen or other buoyant gas being entirely inclosed and sealed within metal, disaster from fire or explosion by reason of ignition thereof is practically impossible. For a like reason the vehicle is not affected by changes in temperature or climatic conditions, the volume and density of the buoyant medium remaining permanent and under full control.

What I claim as my invention and desire to secure by Letters Patent is,

1. In an aerostatic device of the character designated, an elongated float formed with a central compartment containing a gas lighter than the atmosphere, and with end compartments separated from the central compartment by hermetically sealed flexible diaphragms, said hermetically sealed flexible diaphragms, and means for introducing compressed air into and releasing it from each of said end compartments independent of the others, for the purpose described.

2. In an aerostatic device of the character designated, an elongated hermetically sealed float formed of thin sheet metal with a central compartment containing a gas lighter than the atmosphere, and with end compartments separated from the central compartment by hermetically sealed flexible diaphragms, said hermetically sealed flexible diaphragms and means for introducing compressed air into and releasing it from each of said end compartments independent of the others, for the purpose described.

3. In an aerostatic device of the character designated, an elongated hermetically sealed float formed of thin sheet aluminium with a central compartment containing a gas lighter than the atmosphere and with end compartments separated from the central compartment by hermetically sealed flexible diaphragms, said hermetically sealed flexible diaphragms, and means for introducing compressed air into and releasing it from each of said end compartments independent of the others, for the purpose described.

4. An aerostatic chamber divided into three compartments by two hermetically sealed flexible diaphragms, the central chamber containing a gas lighter than the atmosphere, and means for independently introducing compressed air into and releasing it from each of the other two compartments, for the purpose described.

5. An aerostatic chamber divided into three compartments by two hermetically sealed flexible diaphragms, the central compartment containing a gas lighter than the atmosphere, and means for introducing compressed air into or releasing it from the end compartments either simultaneously or independently, for the purpose described.

6. An aerostatic chamber consisting of a cylindrical body formed with convergent ends, hermetically sealed flexible diaphragms dividing said chamber into a central compartment and two end compartments, the central compartment containing a gas lighter than the atmosphere, and means for independently introducing compressed air into or releasing it from each of the said end compartments, for the purpose described.

7. In aerostatic apparatus substantially such as designated, the combination of two hermetically sealed and rigidly connected elongated floats, each consisting of a rigid shell of sheet metal having a central compartment containing a gas lighter than the atmosphere, and end compartments separated from said central compartment by hermetically sealed flexible diaphragms, said hermetically sealed flexible diaphragms, and means for independently introducing compressed air into and releasing it from each of said end compartments, for the purpose described.

8. In aerostatic apparatus substantially such as designated, the combination of two hermetically sealed and rigidly connected elongated floats, each consisting of a rigid shell of sheet aluminium, having a central compartment containing a gas lighter than the atmosphere, and end compartments separated from said central compartment by hermetically sealed flexible diaphragms, said hermetically sealed flexible diaphragms, and means for independently introducing compressed air into and releasing it from each of said end compartments, for the purpose described.

9. In aerostatic apparatus substantially such as designated, the combination of a plurality of hermetically sealed and rigidly connected elongated metallic shells, each formed with a central compartment containing a gas lighter than the atmosphere and with end compartments separated from the central compartment by hermetically sealed flexible diaphragms, said hermetically sealed flexible diaphragms, and means for independently introducing compressed air into and releasing it from each of said end compartments, for the purpose described.

10. In aerostatic apparatus substantially such as designated, the combination of a plurality of hermetically sealed and rigidly connected elongated shells formed of sheet aluminium, each with a central compartment containing a gas lighter than the atmosphere, and with end compartments separated from the central compartment by hermetically sealed flexible diaphragms, said hermetically sealed flexible diaphragms, and means for independently introducing compressed air into and releasing it from each of said end compartments, for the purpose described.

11. In aerostatic apparatus substantially such as designated, the combination of two hermetically sealed elongated floats each consisting of a shell of sheet metal having a central compartment containing a gas lighter than the atmosphere, and end compartments separated from said central compartment by flexible diaphragms, said flexible diaphragms, means for introducing compressed air into and releasing it from said end compartments, and a rigid metallic skeleton frame uniting said floats, for the purpose described.

12. In aerostatic apparatus substantially such as designated, the combination of two hermetically sealed elongated floats, each consisting of a shell of sheet metal having a central compartment containing a gas lighter than the atmosphere, and the end compartments separated from said central compartment by flexible diaphragms, said flexible diaphragms, means for introducing compressed air into and releasing it from said end compartments, a rigid metallic skeleton frame uniting said floats, and propellers mounted on said skeleton frame with their axes between and below the longitudinal axis of said float, for the purpose described.

13. In aerostatic apparatus substantially such as designated, the combination of two hermetically sealed elongated floats, each consisting of a shell of sheet aluminium having a central compartment containing a gas lighter than the atmosphere, and end compartments separated from said central compartment by flexible diaphragms, said flexible diaphragms means for introducing compressed air into and releasing it from said compartments, and a rigid skeleton frame uniting said floats, and made of sections of aluminium tubing joined by couplings made of aluminium, for the purpose described.

14. In aerostatic apparatus substantially such as designated, the combination of two hermetically sealed elongated floats consisting of a shell of sheet aluminium having a central compartment containing a gas lighter than the atmosphere, and end compartments separated from the central compartment by flexible diaphragms, said flexible diaphragms, means for introducing compressed air into and releasing it from said end compartments, and a rigid skeleton frame uniting said floats, and consisting of transverse hoops of aluminium tubing on each float connected with longitudinal sections of aluminium tubing by aluminium couplings and aluminium ties and stay rods between the floats rigidly connecting the hoops and longitudinal tubes on one float with those on the other, for the purpose described.

15. In aerostatic apparatus substantially such as designated, the combination of two hermetically sealed elongated floats each consisting of a shell of sheet metal having a central compartment containing a gas lighter than the atmosphere, and end compartments separated from the said central compartment by flexible diaphragms, said flexible diaphragms, means for introducing compressed air into and releasing it from said end compartments, a rigid metallic skeleton frame uniting said floats, and propellers mounted on said skeleton frame with their axes substantially in coincidence with the longitudinal axis of resistance of the apparatus as a whole, for the purpose described.

16. In aerostatic apparatus substantially such as designated, the combination of two hermetically sealed elongated floats each consisting of a shell of sheet aluminium having a central compartment containing a gas lighter than the atmosphere, and end compartments separated from the said central compartment by flexible diaphragms, said flexible diaphragms, means for introducing compressed air into and releasing it from said end compartments, a rigid frame of aluminium tubing uniting said floats, and propellers mounted on said aluminium frame with their axes substantially in coincidence with the longitudinal axis of resistance of the apparatus, for the purpose described.

17. In aerostatic apparatus substantially such as designated, the combination of two hermetically sealed elongated floats, each consisting of a shell of sheet metal having a central compartment containing a gas lighter than the atmosphere, and end compartments separated from the said central compartment by flexible diaphragms, said flexible diaphragms, means for introducing compressed air and releasing it from said end compartments, a rigid metallic skeleton frame uniting said floats and end pieces it the extremities of each float to which the extremities of the tubular members of the frame are secured, for the purpose described.

18. In aerostatic apparatus substantially such as designated, the combination of two hermetically sealed elongated floats, each consisting of a shell of sheet metal having a central compartment containing a gas lighter than the atmosphere, and end compartments separated from the said central compartment by flexible diaphragms, said flexible diaphragms, means for introducing compressed air into and releasing it from said end compartments, a rigid metallic skeleton frame uniting said floats, end pieces at the extremities of each float to which the extremities of the longitudinal members of the frame are secured, and metallic caps secured to each of said end pieces, for the purpose described.

19. In aerostatic apparatus substantially such as designated, the combination of two hermetically sealed elongated floats each consisting of a shell of sheet metal having a central compartment containing a gas lighter than the atmosphere, and end compartments separated from the said central compartment by flexible diaphragms, said flexible diaphragms, means for introducing compressed air into and releasing it from said end compartments, a rigid metallic skeleton frame uniting said floats, end pieces at the extremities of each float, each end piece being formed with a passage for the introduction of compressed air into that particular end of the shell, and a compressed air pipe connected with each of said end pieces, for the purpose described.

20. In aerostatic apparatus substantially such as designated, the combination of two hermetically sealed elongated floats each consisting of a shell of sheet metal having a central compartment containing a gas lighter than the atmosphere, and end compartments separated from the said central compartment by flexible diaphragms, said flexible diaphragms, means for introducing compressed air into and releasing it from said end compartments, a rigid metallic skeleton frame uniting said floats and consisting of transverse hoops of aluminium tubing on each float connected with longitudinal sections of aluminium tubing by means of aluminium couplings, end pieces at the extremities of each float to which the extremities of the longitudinal members of its frame are secured, each end piece being formed with a passage for the introduction of compressed air into that particular end of the shell, a compressed air pipe connected with each of said end pieces, and a metallic cap secured to each of said end pieces for the purpose described.

21. An aerostatic vessel consisting of a shell of aluminium having its central cylindrical portion formed with convergent ends, hermetically sealed flexible diaphragms dividing said shell into a central compartment and two end compartments, the central compartment containing a gas lighter than the atmosphere, and means for independently introducing compressed air into or releasing it from each of the end compartments, for the purpose described.

22. In aerostatic apparatus substantially such as designated, the combination of two rigidly connected aluminium shells, each having a central cylindrical portion formed with convergent ends, hermetically sealed flexible diaphragms dividing each of said aluminium shells into a central compartment and two end compartments, the central compartment containing a gas lighter than the atmosphere, and means for independently introducing compressed air into and releasing it from each of the said end compartments, for the purpose described.

23. In aerostatic apparatus substantially such as designated, the combination of two hermetically sealed and rigidly connected elongated floats each consisting of a shell of sheet metal having a central compartment containing a gas lighter than the atmosphere and end compartments each, separated from said central compartment by a hermetically sealed flexible diaphragm, said flexible diaphragms, and means for introducing compressed air into and releasing it from all four of said end compartments either simultaneously or independently, for the purpose described.

24. In aerostatic apparatus substantially such as designated, an elongated float formed with a cylindrical body composed of a series of transverse sections each consisting of a single annular piece of sheet metal formed with inturned flanges by which the adjoining transverse sections are united for the purpose described.

25. In aerostatic apparatus substantially such as designated, an elongated float formed with convergent ends and a cylindrical body composed of a series of transverse sections each consisting of a single annular piece of sheet metal formed with inturned flanges by which the adjoining transverse sections are united, for the purpose described.

26. In aerostatic apparatus substantially such as designated, an elongated float formed with a cylindrical body composed of a series of transverse sections each consisting of a single annular piece of sheet metal which is concavo-convex in cross section, each of said annular transverse sections being also formed with inturned flanges by which the adjoining sections are united, for the purpose described.

27. In aerostatic apparatus substantially such as designated, an elongated float formed with convergent ends and a cylindrical body composed of a series of transverse sections each consisting of a single annular piece of sheet metal which is concavo-convex in cross section, each of said annular transverse sections being also formed with inturned flanges by which the adjoining sections are united, for the purpose described.

28. In aerostatic apparatus substantially such as designated, an elongated float formed with a cylindrical body composed of a series of annular sections of sheet aluminium which are convex externally in cross section with inturned flanges by which adjoining sections are united, for the purpose described.

29. In aerostatic apparatus substantially such as designated, an elongated float formed with a cylindrical body composed of a series of annular sections of sheet aluminium having inturned flanges by which the adjoining sections are united, and with convergent ends attached to said body, for the purpose described.

30. In aerostatic apparatus substantially such as designated, an elongated float of sheet metal formed with a cylindrical body having convergent ends each having an apex-section which is removable, for the purpose described.

31. In aerostatic apparatus substantially such as designated, an elongated float of sheet aluminium formed with a cylindrical body having ogival ends, each having an apex-section which is removable, for the purpose described.

32. An aerostatic apparatus of the character designated, consisting of twin-floats united by a skeleton frame and having the weight of the parts supported by them distributed longitudinally between them, with the axis of propulsion below their longitudinal axes and coinciding with the longitudinal axis of resistance to the atmosphere, and with the center of gravity below said common axis of propulsion and resistance, each of said floats having a central compartment containing a gas lighter than the atmosphere, and end compartments separated from the central compartment by flexible diaphragms, and means for introducing compressed air into said compartments, for the purpose described.

33. An aeronautic apparatus of the character designated consisting of two floats formed of sheet aluminium united by a skeleton frame of aluminium, and having the weight of the parts supported by them distributed longitudinally between them, with the axes of propulsion below their longitudinal axes and coinciding with the longitudinal axis of resistance to the atmosphere, and with the center of gravity below said common axis of propulsion and resistance, each of said floats having a central compartment containing a gas lighter than the atmosphere, and end compartments separated from the central compartment by flexible diaphragms, and means for introducing compressed air into said compartments, for the purpose described.

34. In aerostatic apparatus substantially such as designated, the combination with a sheet metal float formed with a detachable section, and with means for allowing the escape of air from said float, of a lining bag of collapsible flexible material of substantially the same shape as the interior surface of the float, and means for inflating said lining within the float, for the purpose described.

35. In aerostatic apparatus, substantially such as designated, a sheet metal float formed with detachable end sections, flexible diaphragms near each extremity of said float, means for allowing the escape of air from said float, means for introducing and withdrawing a collapsible lining bag through one of said diaphragms, said flexible lining bag adapted to fit the inner surface of the float, means for inflating said lining with compressed air, means for sealing the float against atmosphere, and means for introducing into the float a gas lighter than the atmosphere to replace the air displaced by the inflation of the said removable lining, for the purpose described.

36. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, means for allowing the escape of air from said float, means for introducing and withdrawing a collapsible flexible lining bag through one of said diaphragms, said flexible lining bag adapted to fit the inner surface of the float, means for inflating said lining with compressed air, means for sealing the float against the atmosphere, and means for introducing into the float a gas lighter than the atmosphere to replace the air displaced by the inflation of the removable lining, for the purpose described.

37. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, one of said diaphragms being truncated and formed with a detachable end section, a collapsible flexible lining adapted to fit the inner surface of the float and to be introduced or withdrawn through said truncated diaphragm, means for inflating said lining with compressed air, means for allowing the escape of air from said float, means for sealing the float against the atmosphere, and means for introducing into the float a gas lighter than the atmosphere to replace the air displaced by the inflation of the removable lining, for the purpose described.

38. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, the diaphragm at one end of the float being truncated and formed with a detachable end section, a collapsible flexible lining bag adapted to fit the inner surface of the float and to be introduced and withdrawn through said truncated diaphragm, means for inflating said lining with compressed air, means for allowing the escape of air from said float, means for sealing the float against the atmosphere, and means for introducing into the float through the diaphragm at the other end thereof a gas lighter than the atmosphere to replace the air displaced by the inflation of the removable lining, for the purpose described.

39. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, one of the diaphragms being truncated and formed with a detachable end section, a collapsible flexible lining bag adapted to fit the inner surface of the float and to be introduced and withdrawn through said truncated diaphragm, means for inflating said lining bag with compressed air, a series of hatches arranged longitudinally on the float through which air may be expelled from the float, means for sealing said hatches and means for introducing a gas lighter than the atmosphere into the float to replace the air displaced by the inflation of the removable lining, for the purpose described.

40. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, the diaphragm at one end of the float being truncated and formed with a detachable end section, a collapsible flexible lining bag adapted to fit the inner surface of the float and to be introduced and withdrawn through said truncated diaphragm, means for inflating said lining bag with compressed air, a series of hatches arranged longitudinally on the float through which air may be expelled from the float, a cable adapted to be passed through certain of said hatches and to rest upon the flexible lining to render its inflation with compressed air even and uniform, means for securing the hatches after said cable has been withdrawn, and means for introducing into the float through the diaphragm at the other end of the float a gas lighter than the atmosphere to replace the air displaced by the inflation of the said removable lining, for the purpose described.

41. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, the diaphragm at one end of the float being truncated and formed with a detachable end section, a collapsible flexible lining formed with a truncated end for attachment to the truncated diaphragm and adapted to be introduced and withdrawn through said truncated diaphragm and to fit the interior surface of the float, a closing disk for the truncated ends of the lining and diaphragm formed with a central portion which may be slit open, means for inflating said lining with compressed air, means for allowing the escape of air from said float, means for sealing the float against the atmosphere, and means for introducing into the float a gas lighter than the atmosphere to replace the air displaced by the inflation of the removable lining, for the purpose described.

42. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, the diaphragm at one end of the float being truncated and formed with a detachable end section, a collapsible flexible lining formed with a truncated end for attachment to the truncated diaphragm and adapted to be introduced and withdrawn through said truncated diaphragm and to fit the interior surface of the float, a withdrawing cable attached to the inner side of the closed end of the lining, a closing disk for the truncated ends of the lining and diaphragm formed with a central portion which may be slit open, means for inflating said lining with compressed air, means for allowing the escape of air from said float, means for sealing the float against the atmosphere, and means for introducing into the float a gas lighter than the atmosphere to replace the air displaced by the inflation of the removable lining, for the purpose described.

43. In aerostatic apparatus substantially such as designated, the combination with a sheet metal float formed with detachable ends, with a series of hatches and means for sealing the same, and with a mouth or nipple and cap for closing the same, of a flexible collapsible lining bag formed with a flexible neck adapted to be drawn through the mouth or nipple, for the purpose described.

44. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, one of the diaphragms being truncated and formed with a detachable end section and being also provided with a cord by which it may be throttled and closed between its truncated edge and the edge by which it is secured permanently and hermetically to the shell of the float, a collapsible flexible lining bag adapted to fit the inner surface of the float and to be introduced and withdrawn through said truncated diaphragm, means for inflating said lining bag with compressed air, means for allowing the escape of air from said float, means for sealing the float against the atmosphere and means for introducing into the float a gas lighter than the atmosphere to replace the air displaced by the inflation of the removable lining, for the purpose described.

45. In aerostatic apparatus substantially such as designated, a rigid cylindrical sheet metal float formed with a compartment containing a gas lighter than the atmosphere, and with an auxiliary compartment, a flexible hermetically sealed diaphragm forming the partition between said compartments, means for taking and compressing air direct from the atmosphere, and means for introducing said compressed air into and releasing it from said auxiliary compartment, whereby the lighter gas in the first named compartment may be expanded or contracted in volume, for the purpose described.

46. In aerostatic apparatus substantially such as designated, an elongated sheet metal float formed with a central compartment containing a gas lighter than the atmosphere, and with end compartments separated therefrom by hermetically sealed flexible diaphragms, means for taking and compressing air directly from the atmosphere, and means for independently introducing said compressed air into and releasing it from each of said end compartments, for the purpose described.

47. In aerostatic apparatus substantially such as designated, two elongated sheet metal floats coupled rigidly together with their longitudinal axes parallel to each other, each float formed with a central compartment containing a gas lighter than the atmosphere, and with auxiliary end compartments, means for taking and compressing air directly from the atmosphere, and means for independently introducing said compressed air into and releasing it from each of said four end compartments, for the purpose of varying and regulating the specific gravity of the several ends of the floats substantially as described.

48. In aerostatic apparatus substantially such as designated, two elongated sheet metal floats coupled rigidly together with their longitudinal axes parallel to each other, each float being formed with a central compartment containing a gas lighter than the atmosphere, and with auxiliary end compartments, each separated from said central compartment by a hermetically sealed flexible diaphragm, and means for independently introducing compressed air into and releasing it from each of said end compartment, for the purpose described.

49. In aerostatic apparatus substantially such as designated, two elongated sheet metal floats coupled rigidly together with their longitudinal axes parallel to each other, each float being formed with a central compartment containing a gas lighter than the atmosphere, and with auxiliary end compartments each separated from said central compartment by a hermetically sealed flexible diaphragm, means for taking and compressing air directly from the atmosphere, means for storing said compressed air and means for introducing said compressed air independently into and releasing it from each of said end compartments, for the purpose described.

50. In aerostatic apparatus substantially such as designated, a sheet metal float consisting of a cylindrical body having convergent ends with detachable apex-sections, flexible diaphragms near each extremity of the float fitting within and conforming to said convergent ends when the diaphragms are collapsed, the diaphragm at one end of the float being truncated and formed with a detachable end section, a collapsible flexible lining bag adapted to fit the inner surface of the float and to be introduced and withdrawn through said truncated diaphragm, said lining bag being formed with a series of external loops arranged centrally and longitudinally upon its upper side, means for inflating said lining bag with compressed air, means for admitting of the expulsion of the atmosphere from the float, a cable adapted to be passed through said series of loops on the top of the lining bag for the purpose of rendering its inflation uniform, means for sealing the float, and means for introducing a gas lighter than the atmosphere into the float to replace the air displaced by the inflation of the said removable lining bag, for the purpose described.

51. In aerostatic apparatus substantially such as designated, a sheet metal float consisting of a cylindrical body having convergent ends with detachable apex-sections, a collapsible flexible lining bag adapted to fit the inner surface of the float, said lining bag formed with a series of external loops arranged centrally and longitudinally upon its upper side, a cable adapted to be passed through said series of loops on the top of the lining bag, means for inflating said lining bag, means for admitting of the expulsion of the atmosphere from the float, means for removing said cable, and means for sealing the float, for the purpose described.

52. In aerostatic apparatus substantially such as designated, a sheet metal float consisting of a cylindrical body having convergent ends with detachable apex-sections, a collapsible flexible lining bag adapted to fit the inner surface of the float, means for inflating said lining bag with compressed air, means for admitting of the expulsion of the atmosphere from the float, means for sealing the float against the atmosphere, means for admitting a gas lighter than the atmosphere into the float to replace the air displaced therefrom, and means for withdrawing the said collapsible lining bag from the float without admitting the atmosphere thereto, for the purpose described.

53. In aerostatic apparatus substantially such as designated, the combination of two sheet metal floats formed with cylindrical bodies and convergent ends with detachable apex-sections, each float being formed with a central compartment containing a gas lighter than the atmosphere and separated from the end compartments by flexible diaphragms which fit the convergent ends of said floats when the diaphragms are collapsed, a skeleton frame consisting of transverse and longitudinal tubular members united at their juncture by coupling plates common to both the transverse and the longitudinal members, the extremities of said longitudinal members being also secured to the convergent ends of the floats, straps securing both the transverse and the longitudinal members of the frame to the body of the float, propellers supported on said skeleton frame near each end of the apparatus, motors for operating the same, a central platform on said skeleton frame, air compressing mechanism on said central platform, and means for introducing the air compressed thereby into either or all of the end compartments in the floats, for the purpose described.

54. In aerostatic apparatus substantially such as designated, the combination of two floats of sheet aluminium formed with corrugated cylindrical bodies and ogival shaped ends having detachable apex-sections, each float being formed with a central compartment containing a gas lighter than the atmosphere and separated from said compartment by flexible diaphragms which fit the ogival shaped ends of the floats when the diaphragms are collapsed, a skeleton frame consisting of transversely and longitudinally arranged tubular aluminium members united at their juncture by aluminium coupling plates common to both the transverse and the longitudinal members, the extremities of said longitudinal members being also secured to the ogival ends of the float, straps of aluminium securing both the transverse and the longitudinal members of the frame to the body of the float, the parts thus embracing the floats being united by tubular cross ties of aluminium reinforced by aluminium stay rods, propellers supported on said skeleton frame near each end of the apparatus, motors for operating the same, a central platform on said skeleton frame, air compressing mechanism on said central platform, a compressed air reservoir thereon, and means for introducing the compressed air into either or all of the end compartments in the float, for the purpose described.

55. In aerostatic apparatus substantially such as designated, a sheet metal float having a cylindrical body formed with transverse annular externally convex corrugations, for the purpose described.

56. In aerostatic apparatus substantially such as designated, a sheet metal float having convergent ends united by a cylindrical body which is formed with transverse annular externally convex corrugations, for the purpose described.

MARIO SCHIAVONE.

Witnesses:
CHARLES RECCHIA,
GEO. WM. MIATT.